(12) United States Patent
Commarford et al.

(10) Patent No.: US 7,490,286 B2
(45) Date of Patent: Feb. 10, 2009

(54) HELP OPTION ENHANCEMENT FOR INTERACTIVE VOICE RESPONSE SYSTEMS

(75) Inventors: Patrick M. Commarford, Delray Beach, FL (US); Cheryl A. Kotan, Omaha, NE (US); James R. Lewis, Delray Beach, FL (US); Wallace J. Sadowski, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/670,632

(22) Filed: Sep. 25, 2003

(65) Prior Publication Data
US 2005/0081152 A1    Apr. 14, 2005

(51) Int. Cl.
*G06N 3/00* (2006.01)
(52) U.S. Cl. .................................................... 715/200
(58) Field of Classification Search ................. 715/500, 715/700, 705, 716, 513, 517, 523, 530, 234, 715/243, 254, 255, 200; 704/270, 275, 270.1
See application file for complete search history.

(56) References Cited
U.S. PATENT DOCUMENTS

| | | | |
|---|---|---|---|
| 4,964,077 A | 10/1990 | Eisen et al. | |
| 5,124,942 A | 6/1992 | Nielson et al. | |
| 5,287,448 A | 2/1994 | Nicol et al. | |
| 5,485,544 A | 1/1996 | Nonaka et al. | |
| 5,513,308 A | 4/1996 | Mori | |
| 5,737,726 A | 4/1998 | Cameron et al. | |
| 6,269,336 B1* | 7/2001 | Ladd et al. ................... | 704/270 |
| 6,314,449 B1 | 11/2001 | Gallagher et al. | |
| 6,725,378 B1* | 4/2004 | Schuba et al. ................. | 726/13 |
| 2002/0010715 A1* | 1/2002 | Chinn et al. ................. | 707/514 |
| 2004/0006478 A1* | 1/2004 | Alpdemir et al. ............ | 704/275 |
| 2004/0122674 A1* | 6/2004 | Bangalore et al. ........... | 704/276 |

* cited by examiner

*Primary Examiner*—Stephen S Hong
*Assistant Examiner*—Kyle R Stork
(74) *Attorney, Agent, or Firm*—Akerman Senterfitt

(57) ABSTRACT

A method for providing help within an interactive voice response application can include the step of determining an interactive voice response event corresponding to a request for help. The event can be classified as a default help request, which can be a system initiated help request, or a user initiated help request. If the event is classified as a default help request, a time for receiving user input can be set to a default value. If, however, the event is classified as a user initiated help request, the time for receiving user input can be set to a value less than the default value. The interactive voice response application can take programmatic action upon expiration of the time for receiving user input.

11 Claims, 4 Drawing Sheets

HELP OPTION ENHANCEMENT FOR INTERACTIVE VOICE RESPONSE SYSTEMS

BACKGROUND

1. Field of the Invention

The present invention relates to the field of computer software and, more particularly, to enhancing the presentation of help messages in interactive voice response (IVR) systems.

2. Description of the Related Art

Interactive voice response (IVR) systems can provide human/computer interfaces included in a variety of applications, such as customer relation management systems, automated survey applications, telemarketing applications, customer service kiosks, and the like. IVR systems can audibly present a series of user selectable options and can responsively receive user input in the form of a speech input, a touch tone-keypad selection, and other such responses. Depending upon a user's selection, the IVR system can audibly present additional options, can audibly play an informational message, can initiate an automated action like a bill payment action, and/or can transfer a customer to a human agent.

IVR systems commonly present numerous help messages responsive to user initiated help requests and/or system initiated help requests. A user initiated help request refers to a request where an IVR user explicitly selects an IVR help option. A system initiated help request can result from a variety of system events such as a time-out event, where no input is received for an established duration, and a no-match event, where input cannot be matched to a valid IVR option.

A requested help instance can result in a help dialog state being initiated for resolving the problem indicated within the help request, where a dialog state is an IVR branch for handling a specified problem. Commonly, one or more sets of help messages can be associated with the dialog state. The set of IVR help messages can be arranged in a variety of levels of increasing descriptive content and/or according to an established hierarchy of content. For example, a first-level help message can include short phases providing context-sensitive help information. These short phrases can describe the available help options and corresponding keypad and/or voice commands necessary to select a desired option. A second-level help message can present the same help information as the first-level help message, yet provide more comprehensive explanations for the menu options or input actions. Alternatively, a second-level help message can be a further decomposition of one option presented within the first-level help message. It should be noted that generally the greater number of distinct messages and/or menus provided within an IVR system, the more expensive it becomes to maintain and develop the IVR system. Accordingly, it can be preferable to implement as few help messages as possible to achieve a desired functionality, while simultaneously implementing a sufficient number of help messages to achieve the desired usability.

Most current systems provide users with some help or re-prompting when a user explicitly requests help (through speech or keypad), provides no input, or provides an input resulting in a no-match event. One current solution is to treat explicit requests for help, no-input events, and no-match events equally. For example, responsive to a first help initiating event, the IVR can present users with a small amount of context-sensitive help information, such as a first-level help message. Responsive to a second help initiating event, the IVR can present users with additional help information, such as a second-level help message. The IVR can include any number of help levels that can be presented in this fashion. At some point in the help process, a user can be transferred to a live call agent, can be transferred to a dual-toned multi-frequency (DTMF) version of an application, and/or can be cycled through the help levels.

While the conventional IVR help implementation method is generally successful for system initiated help requests, it is only partially successful for users who explicitly request help. More specifically, the above detailed help method is generally adequate for users that need only a small amount of context-sensitive help, such as a first-level of help. Other users, however, who explicitly request help are often interested in hearing all help that is available for the dialog state for which help was requested. Systems requiring users to request "help" from within the first-level message can be highly confusing to users. Appreciably, it can be unintuitive for users to request "help" again after having requested "help" a first time.

A second conventional solution is to provide users who explicitly request help with all the help information available at a given point in the dialog, but to provide help resulting from a system initiated help request with short, context-sensitive help. The second conventional solution penalizes help requesters who need only the short context-sensitive help. Even when systems permit barge in, many users prefer not to barge in (interrupt a system message) for fear of missing an important message and, in speech recognition systems, to conform with the typical social protocols of conversation. Accordingly, users that explicitly initiated help can be required to listen to additional, unnecessary information. Further, users who receive system initiated help can often (unhelpfully) hear the same help information twice in a row due to commonly utilized branching mechanisms. In light of the above-mentioned problems associated with current methods for providing IVR help, one can appreciate that a method of providing IVR help that does not confuse users, that adequately addresses the help requirements of all IVR users, and that does not significantly increase IVR overhead, is needed.

SUMMARY OF THE INVENTION

The present invention provides a method, a system, and an apparatus for presenting help options within an interactive voice response (IVR) system. More specifically, help for a dialogue state can result from a system initiated help request or a user initiated help request. The system initiated help request can be triggered by a no-response event and/or a no-match event, where the no-response event can occur whenever no input is received by the IVR system for an established duration, and where the no-match event can occur whenever the IVR system receives input for which the IVR system cannot associate with a valid matching IVR option. Regardless of how help was initialized, a first-level help message for the dialogue state can be presented. At least one IVR action can be associated with a no-response event. For example, a time-out threshold can be established and compared against a help-timer, which can begin as soon as the help message is presented. When the help-timer exceeds the time-out threshold, an appropriate IVR action can be initiated.

Whenever IVR help for the dialog state results from a user initiated help request, the time-out threshold can be reduced from the value established for system initiated help to a lower value established for user initiated help. Accordingly, all subsequent IVR actions for the dialog state that are triggered by no-response actions are triggered in a more expeditious fashion than otherwise. The user initiated help request that reduces the time-out threshold can occur when help is originally initiated for the dialogue state, can occur after the first-level of help for the dialogue state is presented, or can occur after the n-th level of help within the dialogue state is presented. Once the shortened period has been established for the time-out threshold, however, that shortened period can remain in effect for subsequent IVR actions that occur during a dialogue instance. Whenever the IVR advances from the current dialogue state to a different dialogue state, the time-out threshold for help can be reset to the default value.

The benefits of the present invention can be understood by examining users that explicitly select IVR help (user initiated) versus those that receive help by default (system initiated). The majority of both types of users can desire a concise presentation of help options. Some users who explicitly request help, however, are interested in hearing all the help that is available at that point in the dialogue. Further, significant portions of users that explicitly request help assume that the information they hear following their initial request is all the information available.

Users who receive help by default (system initiated), for a variety of reasons, typically require a longer delay than those users who have explicitly requested help. If comprehensive help follows an initial help message and if too short of a delay exists after an initial help presentation, users who receive help by default can be annoyed. On the other hand, users desiring the detailed help are likely to be frustrated and/or confused and/or select a convenient but incorrect choice if too long of a delay exists between help messages. For this reason, it can be beneficial to automatically present a comprehensive second-level help message after pausing for a relatively short period whenever a first-level help message has been explicitly requested by a user and to pause for a relatively longer period whenever help has resulted from a system initiated default event.

One aspect of the present invention can include a method for providing help within an IVR application. The method can include the step of determining an IVR event corresponding to a request for help. The event can be classified as a default help request, which can be a system initiated help request, or a user initiated help request. A default help request can include a help request resulting from a no-match event as well as a help request resulting from a no-response event. If the event is classified as the default help request, a time for receiving user input can be set to a default value. If, however, the event is classified as a user initiated help request, the time for receiving user input can be set to a value less than the default value. The IVR application can take programmatic action upon expiration of the time for receiving user input. In one embodiment, the default value can be at least six seconds and the value less than the default value can be at most three seconds.

Another aspect of the present invention can include a method for providing help within an IVR application. The method can include the step of determining an event that initiates IVR help. A time-out threshold can be set to a default time. In one embodiment, the default time can be at least six seconds. The help-initializing event can include an explicit user request for help, a no-response event, and/or a no-match event. If the action includes an explicit user request for help, the time-out threshold can be decreased. In the preferred embodiment, the decrease in the time-out threshold applies only to the dialog state in which the decrease took place, with the default threshold restored upon moving to the next dialog state. In one embodiment, the time-out threshold can be at most three seconds. In a further embodiment, it can be preferable to set the time-out threshold between two seconds and three seconds. A first help message can then be audibly presented. In another embodiment, after the presentation of the first help message has begun, an explicit user request for help can be received. In such an embodiment, if the time-out threshold equals the default time, the time-out threshold can be decreased.

Once the first help message has been presented, a no-response timer can be started. If the no-response timer exceeds the time-out threshold, a second help message can be audibly presented automatically. The second help message can provide more comprehensive help than the first help message. Once the second help message has been presented, a no-response timer can be started for the second help message. If the no response timer for the second help message exceeds the time-out threshold, a previously established IVR operation can be preformed. The previously established IVR operation can include resetting the time-out threshold to its default value, audibly presenting a help message, cycling back to the initial help message, establishing a connection with a human agent, and/or establishing a connection with an automated system, such as a dual-toned multi-frequency (DTMF) enabled application.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
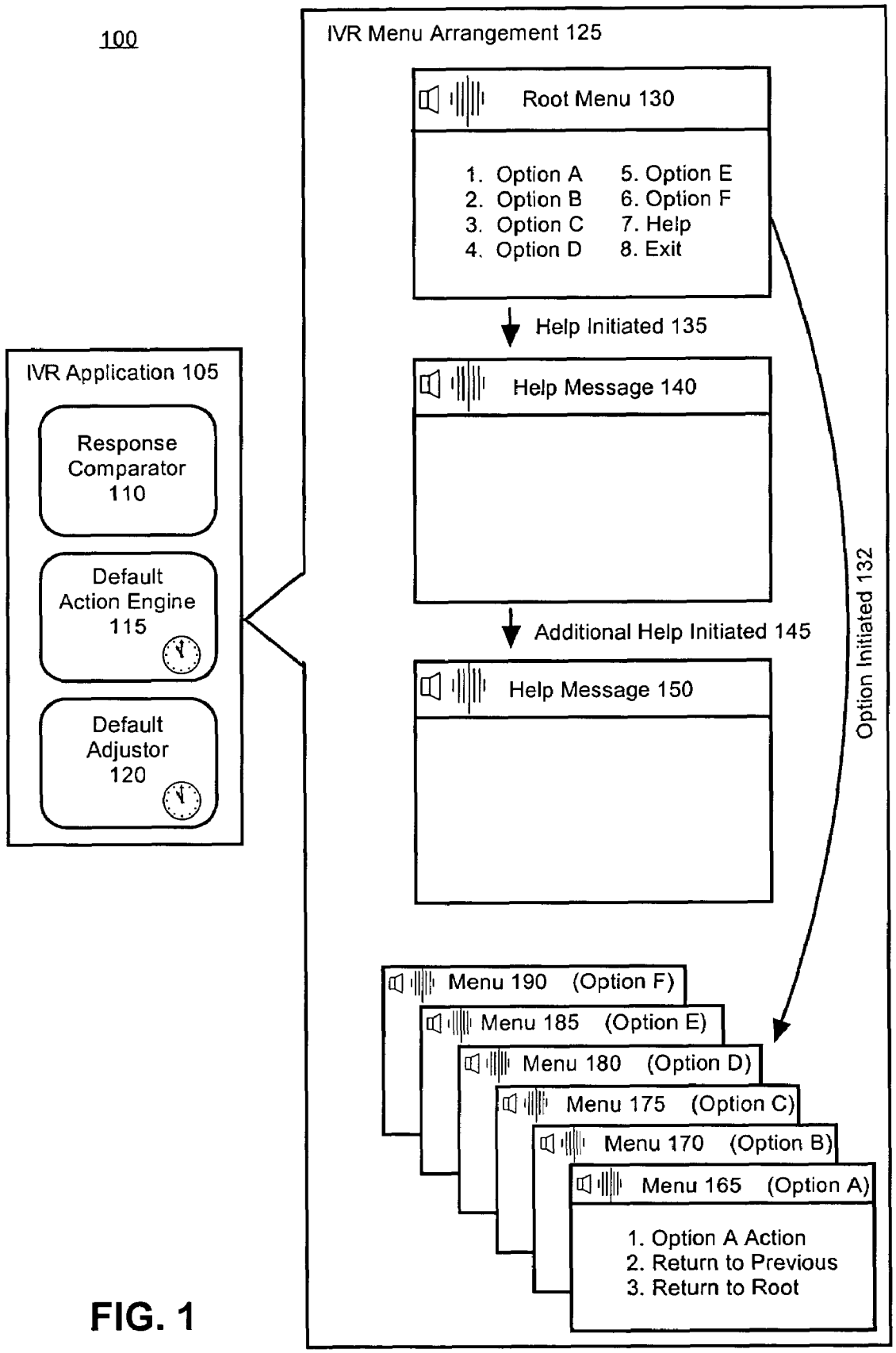
FIG. 1 is a schematic diagram illustrating a system showing one embodiment of an interactive voice response (IVR) application and related IVR menu arrangements according to the inventive arrangements disclosed herein.

FIG. 1 is a schematic diagram illustrating a system 100 showing one embodiment of an interactive voice response (IVR) application 105 and related IVR menu arrangements 125 according to the inventive arrangements disclosed herein. The IVR application 105 can be a software application configured to audibly present options in the form of speech segments and receive responses to presented options. The IVR application 105 can present a series of related options to a user in predefined groupings called IVR menus. The responses received by the IVR application 105 can be in the form of touchpad entries, voice responses, and the like. When the IVR application 105 receives one or more selections, an IVR response can be initiated. IVR responses can include presentation of further IVR menus, requesting the input of information such as time, date, or account number, establishing a connection between the IVR user and a human agent or other automated system, performing one or more automated software actions, such as a customer account query, and other similar IVR actions.

The IVR application 105 can include a multitude of components such as a response comparator 110, a default action engine 115, and a default adjustor 120. The response comparator 110 can receive user-responses, convert the responses to a format internally used by the IVR application 105 as necessary, and match the received responses against a set or collection of valid responses. For example, the response comparator 110 can receive a touchpad input and search for a corresponding option. In another example, the response comparator 110 can receive a voice input, speech-to-text convert the input, and search for a matching option. In particular embodiments, speech-to-text accuracy can be improved by limiting the conversion grammar used when performing the speech-to-text conversions to a limited grammar that includes all contextually valid responses. If the response comparator 110 determines that a received response matches an IVR option, then an action relating to the matching option can be automatically initiated. If, on the other hand, the response comparator 110 is unable to match a received input with an available IVR option, a no-match event can occur. A no-match event can signify that the user-provided input could not be matched with an available IVR option and/or that a user speech input is not contained within a grammar established by the IVR application 105 for performing text-to-speech conversions.

The default action engine 115 can be a component of the IVR application 105 that handles default IVR situations, such as situations relating to time-out events. For example, if a user fails to respond to the IVR application 105 after a designated time, a pre-selected action can be automatically taken. One such pre-selected action can be initializing a help message, presupposing that the user has failed to respond because that user does not fully understand one or more options that have been presented.

The default adjustor 120 can dynamically alter one or more of the conditions used by the default action engine 115, such as one or more time-out thresholds. Specifically, the default adjustor 120 can establish one time-out threshold for a help message that was initiated by default (system initiated) and a shorter timer-out threshold for a help message that was initiated through an explicit user selection (user initiated). It should be noted, however, that the default adjustor 120 is not limited to manipulating time-out conditions, but can dynamically alter the behavior of the default action engine 115 in any fashion.

For example, the default adjustor 120 can cause a menu or other prompt to be repeated the first time a time-out event occurs subsequent to a no-match event. If a second time-out event occurs after the menu or prompt has been repeated once, the default adjustor 120 can establish settings resulting in the presentation of a designated help message. If the time-out event occurs subsequent to a no-response event instead of a no-match event, then the default adjustor 120 can establish settings resulting in the presentation of the designated help message. In the second scenario, the original menu or prompt would not be repeated to the IVR user.

The IVR application 105 can include many different menus and menu arrangements including, but not limited to, IVR menu arrangement 125. IVR menu arrangement 125 includes a root menu 130 that can be audibly presented to a user that has accessed the IVR application 105. The root menu 130 can include eight selectable options 1-8 including: (1) Option A, (2) Option B, (3) Option C, (4) Option D, (5) Option E, (6) Option F, (7) Help, and (8) Exit.

If any of the selections (1)-(6) are selected, a suitable option initiation 132 action can be performed resulting in an appropriate IVR action being initialized. For example, if selection (1) for Option A is received, IVR menu 165 corresponding to Option A can be initiated. In another example, if selection (2) for Option B is selected, corresponding menu 170 can be initiated. Similarly, menu 175 can be initialized responsive to selection (3), menu 180 can be initialized responsive to selection (4), menu 185 can be initialized responsive to selection (5), and menu 190 can be initialized responsive to selection (6).

If selection (8) or the "exit" option is selected, the IVR application 105 can disconnect the user from the IVR application 105. If, on the other hand, selection (7) or the "help" option is selected, a help initiated 135 procedure can be activated. The help initiated 135 procedure can also result from a no-match event, such as the user selecting option (9) that is not recognized by the response comparator 110. Additionally, the help initiated 135 procedure can result from a no-response event that occurs by default after a previously established response period has passed without input being received by the IVR application 105.

The help initiated 135 procedure can convey help message 150 initialization information to the default adjustor 120, thereby allowing the default adjustor 120 to perform suitable operations. One such operation can establish a time-out threshold for help message 150 of approximately six to eight seconds if help message 140 was initialized by a no-response event or a no-match event. Another such operation can establish a time-out threshold for help message 150 of approximately two to three seconds if help message 140 was initialized by explicitly selecting help from the root menu 130. Once the time-out threshold has been established, the help initiated 135 procedure can appropriately initialize help message 140; starting help message 140 after approximately six to eight seconds for system initiated help and starting help message 140 immediately after a user request for help for user initiated help. It should be appreciated that the stated delay times are used for exemplary purposes only and that the invention is not to be limited in this regard.

Help message 140 can provide one form of help for the menu or prompt with which it is associated, such as root menu 130. Help message 150 can provide another (or the same) form of help for the menu or prompt with which it is associated, such as root menu 130. In one embodiment, help message 140 can be concise and help message 150 can be more verbose. In another embodiment, help message 140 can be verbose and help message 150 can be more concise.

The exact method for requesting help or making an IVR selection can depend upon the manner in which the IVR application 105 is implemented. In one example, a selection can be made by pressing the number one on a dial pad and/or by speaking the number one. In another example, the selection can be made by speaking "option one" and/or a natural language phrase translated by the IVR application 105 as referring to the first option. Appreciably, any of a variety of IVR selection methods can be utilized in conjunction with the present invention and the invention is not to be limited in this regard.

Figure 2:
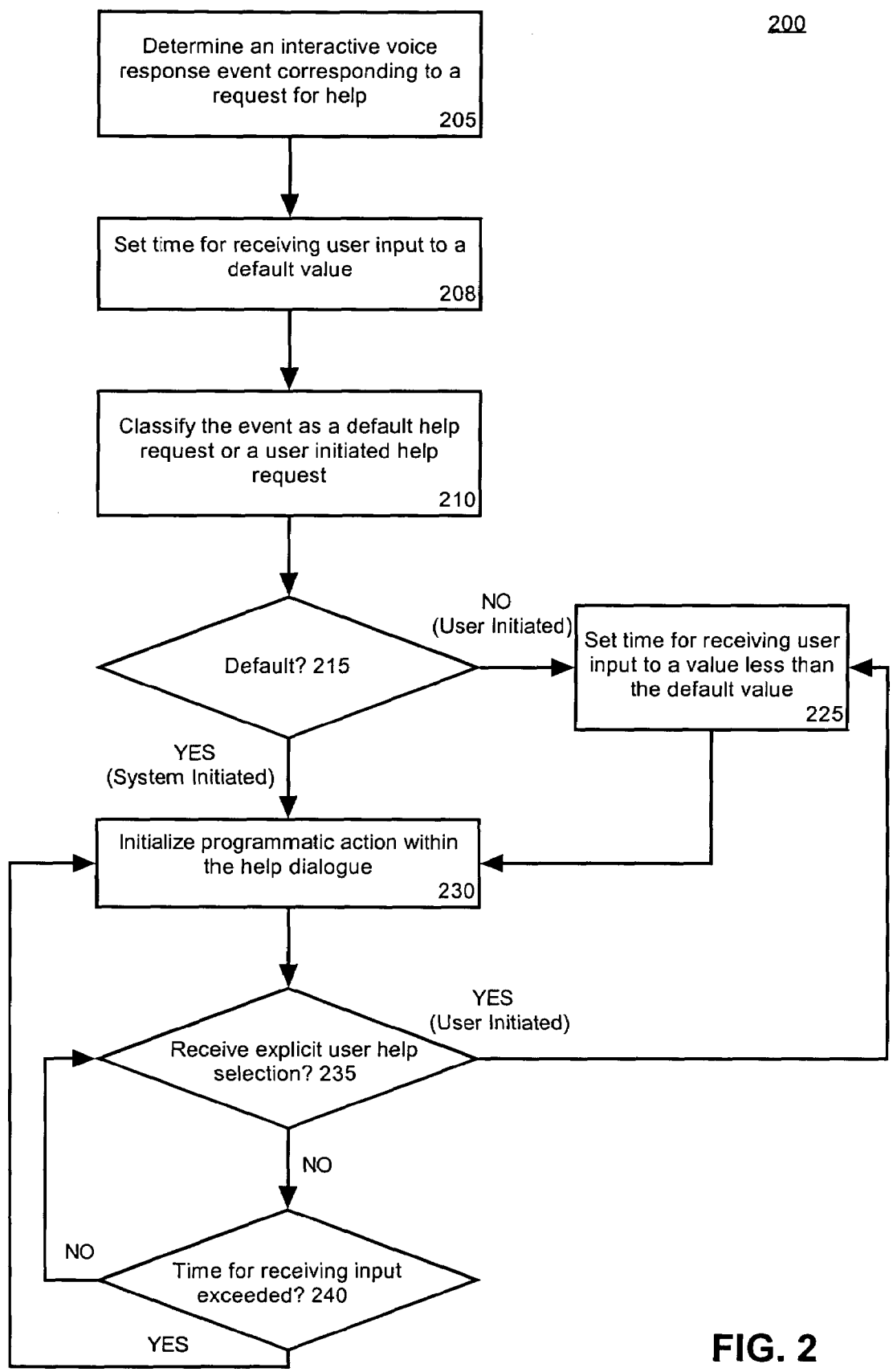
FIG. 2 is a flow chart illustrating a method for providing help within an IVR application according to the inventive arrangements disclosed herein.

FIG. 2 is a flow chart illustrating a method 200 for providing help within an IVR application according to the inventive arrangements disclosed herein. The method 200 can be performed using any IVR system that includes one or more contextually relevant help messages. The method 200 can begin in step 205 by determining an interactive voice response event corresponding to a request for help. In step 208, a default time for receiving help-related user input can be determined. In step 210, the IVR event that initiated help can be classified as a default help request (system initiated) or a user initiated help request. Default help requests can include no-match events and no-response events. In step 215, if the event is a default event, the method can proceed to step 230, where the IVR system can perform at least one programmatic action relating to help for the selected dialogue. For example, a first contextually relevant help message can be presented. In another example, a programmatic action causing a user to be connected to an IVR agent can be activated. Any action that the IVR is capable of performing can be the programmatic action initiated by step 230.

If in step 215, the event is a user initiated request for help, the method can proceed to step 225, where the default time for receiving help-related input can be set to a value less than the default value. Once the time has been decreased, the method can immediately proceed to step 230, where the user selected action can be initiated. Once the programmatic action of step 230 has been performed, the method can proceed to step 235, where the IVR system can determine whether the user has explicitly selected help. If so, the method can proceed to step 225, where the default time can be decreased. The method can then proceed to step 230, where an appropriate IVR action can be performed. For example, if in step 235 a user explicitly requested a second-level contextually relevant help message, a suitable second-level help message can be presented in step 230. If no explicit selection is made is step 235, however, the method can proceed to step 240. In step 240, a determination can be made as to whether the time for receiving input has been exceeded. If not, the method can cycle between step 235 and step 240 until either a user selection is received in step 235 or until the time for receiving input is exceeded in step 240. If in step 240, the time for receiving input is exceeded, the method can proceed to step 230, where an appropriate programmatic action can be initiated.

Figure 3A:
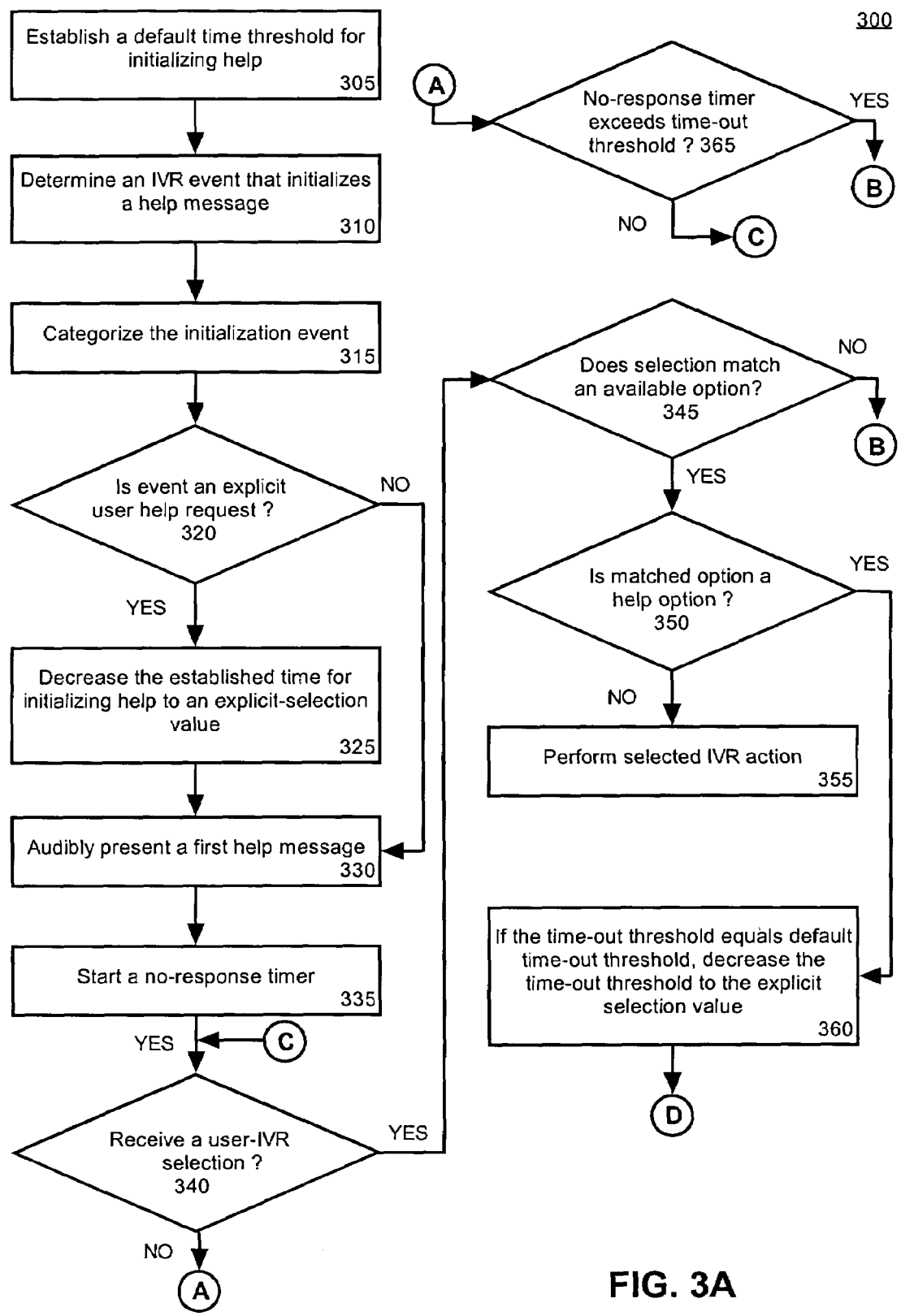
FIGS. 3A and 3B are flow charts illustrating another method for providing help within an IVR application according to the inventive arrangements disclosed herein.
Figure 3B:
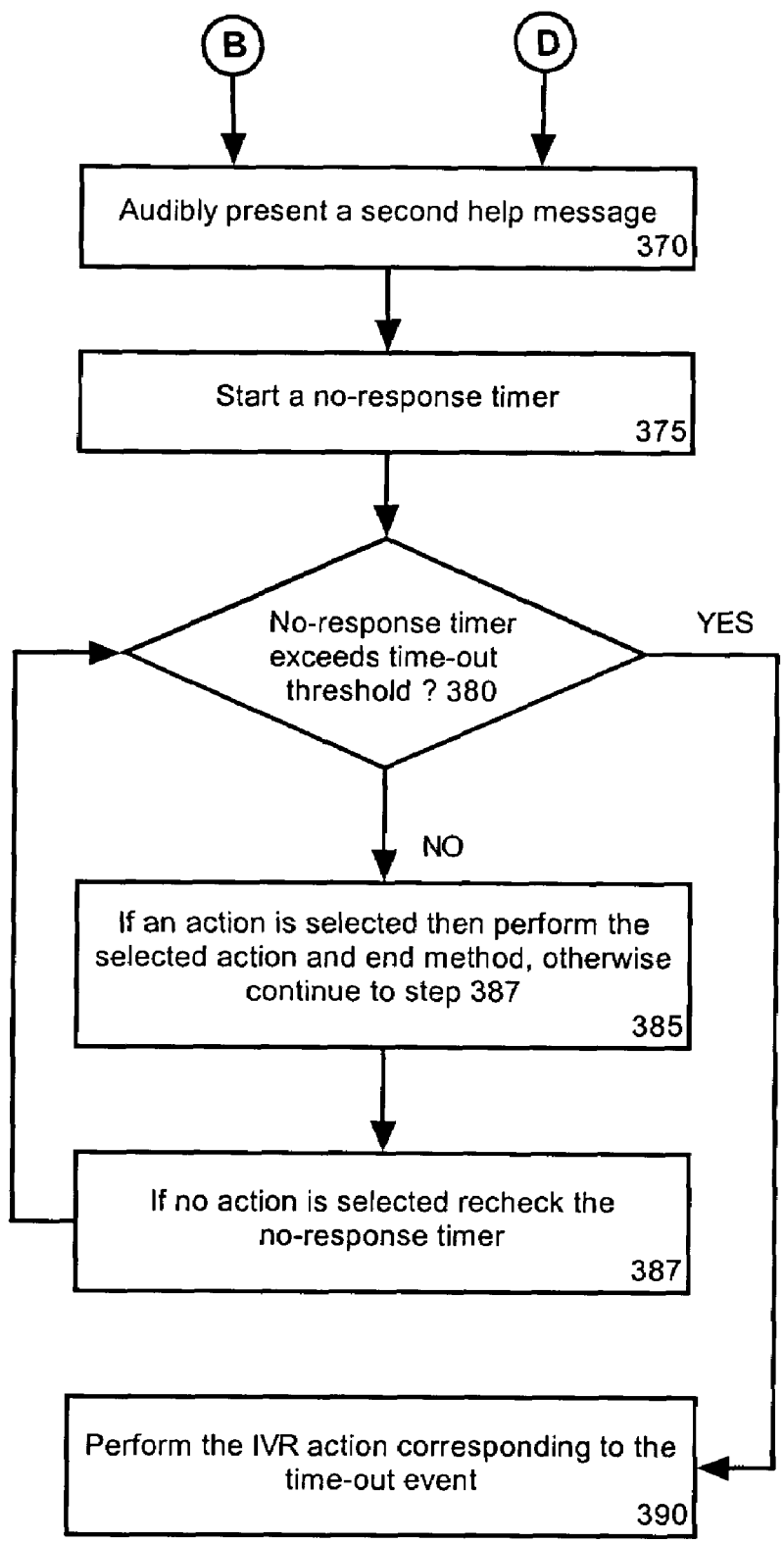

FIGS. 3A and 3B are flow charts illustrating a method 300 for providing help within an IVR application according to one embodiment of the inventive arrangements disclosed herein. Method 300 can begin in step 305 where a default time threshold for initializing help can be established. The default time threshold represents the time an IVR application will pause before a no-response event is triggered. A typical default value can be, but is not limited to, between approximately six and eight seconds. In step 310, an IVR event can be received that initializes a contextually relevant help message. In step 315, the initializing action can be categorized as an explicit user selection request, a no-response event, and/or a no-match event. In step 320, if the event is an explicit user selection action, the method can proceed to step 325, otherwise the method can proceed to step 330.

In step 325, the established time threshold for initializing help can be decreased to an explicit-selection value, where the explicit-selection value can be a previously established time that is less than the default time. In one embodiment, the explicit-selection value can be, but is not limited to, between approximately two and three seconds. In step 330, the first help message can be audibly presented. In step 335, a no-response timer can be started. In step 340, if a user IVR selection is not received the method can proceed to step 365. In step 365, the no-response timer can be compared against a time-out threshold. If the time-out threshold is not exceeded, the method can proceed to step 340, where a user-selection can be received. If the time threshold is exceeded in step 365, a time-out condition can result in the presentation of a second contextually relevant help message and the resetting of the no-response timer. Accordingly, the method can proceed from step 365 to step 370.

If in step 340, an IVR selection is received, the method can proceed to step 345, where the received selection can be compared with a set of recognized or available IVR options. If in step 345, the received option does not match an available option a no-match event can be initialized causing the method to proceed to step 370, where the second help message can be presented and the no-response timer can be reset. If in step 345, an available option is matched with the received selection, the method can proceed to step 350. If in step 350, the matched option is not a help option, the method can proceed to step 355 where the matched IVR action can be performed. The method can then end or repeat as necessary. If, however, the matched option is a help option, the method can proceed to step 360. In step 360, if the current time-out threshold equals the default time-out threshold as opposed to the explicit-selection value, then the time-out threshold can be decreased to the explicit-selection value. Then method can then proceed to step 370.

In step 370, the second help message can be audibly presented. In step 375, a no-response timer can be started. In step 380, the no-response timer can be compared to the time-out threshold. If the time out threshold is not exceeded, the method can proceed to step 385. In step 385, if a user input is provided, then an IVR action associated with the input can be performed. The method can then end or repeat as necessary. If no input is provided, then the method can proceed to step 387 where the no-response timer can be rechecked by looping to step 380. If in step 380, the no-response timer exceeds the time-out threshold, the method can proceed to step 390, where the IVR action corresponding to the time-out event can be performed. Any previously designated IVR action can be associated with the time-out event and can be performed at this stage. For example, the time-out event of step 390 can result in the first help message being repeated. Similarly, the time-out event can cause the second help message to be repeated and/or can cause a new, third contextually relevant help message to be presented. In another example, the time-out event of step 390 can result in a connection being established between the IVR user and a human agent and/or can result in the IVR user being disconnected from the IVR application. It should be noted that the method can have more levels of help messages than those described herein as required by particular IVR applications.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for providing help within an interactive voice response application comprising the steps of:

determining an interactive voice response event;

classifying said event as a default help request if said event is one of a no-match event and a time-out event, wherein the no-match event occurs when said event does not correspond to a user option provided by the application, and wherein the time-out event occurs if a user fails to respond to an application prompt within a predetermined duration of time;

classifying said event as a user initiated help request if said event is a user request for help and not a non-help request;

setting a time for receiving user input to a default value if said event is classified as said default help request;

setting said time for receiving user input to a value less than said default value if said event is classified as said user initiated help request, wherein said interactive voice response application takes one of a plurality of different programmatic actions upon expiration of said time for receiving user input;

repeating a previous presentment of a menu or other prompt if a first time-out event occurs subsequent to a no-match event;

if a second time-out event occurs after repeating the previous presentment of the menu or other prompt, presenting a predetermined help message;

if the first time-out event occurs subsequent to a no-response event, presenting the predetermined help message such that the previous presentment of the menu or other prompt is not repeated;

if said event is a default help request, determining whether the default help request is a no-match event or whether said default help request is a time-out event;

performing one of the plurality of programmatic actions if the default help request is a no-match event; and performing a different one of the plurality of programmatic actions if the default help request is a time-out event.

2. The method of claim 1, wherein said default value is at least six seconds and wherein said value less than said default value is at most three seconds.

3. A method for providing help within an interactive voice response application comprising the steps of:

determining an interactive voice response event corresponding to a help message request;

classifying said event as a default help request if said event is one of a no-match event and a time-out event, wherein the no-match event occurs when said event does not correspond to a user option provided by the application, and wherein the time-out event occurs if a user fails to respond to an application prompt within a predetermined duration of time, and classifying said event as a user initiated help request if said event includes a user request for help;

setting a time-out threshold to a default time;

if and only if said event includes a user request for help, decreasing said time-out threshold;

audibly presenting a first help message;

once said first help message has been presented, starting a no-response timer; and if said no-response timer exceeds said time-out threshold, audibly presenting a second help message, wherein said second help message comprises one of a plurality of different help messages;

repeating a previous presentment of a menu or other prompt if a first time-out event occurs subsequent to a no-match event;

if a second time-out event occurs after repeating the previous presentment of the menu or other prompt, presenting a predetermined help message;

if the first time-out event occurs subsequent to a no-response event, presenting the predetermined help message such that the previous presentment of the menu or other prompt is not repeated;

if said event is a default help request, determining whether the default help request is a no-match event or whether said default help request is a time-out event;

audibly presenting one of the plurality of help messages if the default help request is a no-match event; and audibly presenting a different one of the plurality of help messages if the default help request is a time-out event.

4. The method of claim 3, further comprising the steps of:

once said second help message has been presented, starting a no-response timer; and if said no-response timer for said second help message exceeds said time-out threshold, performing a previously established IVR operation.

5. The method of claim 4, wherein said previously established IVR operation includes resetting said time-out threshold to said default time.

6. The method of claim 4, wherein said previously established IVR operation includes audibly presenting a help message.

7. The method of claim 4, wherein said previously established IVR operation includes at least one of cycling back to an initial help message, establishing a connection with a human agent, and establishing a connection with an automated system.

8. The method of claim 3, wherein said action which initialized said first help message includes at least one from the group consisting of said explicit user selection action, a no-response event, and a no-match event.

9. The method of claim 3, further comprising the steps of:

after said presentation of said first help message has begun, receiving an explicit user request for help; and if said non-response threshold equals said default time, decreasing said time-out threshold.

10. The method of claim 3, wherein said decreased time-out threshold is at most three seconds.

11. The method of claim 3, wherein said default time is at least six seconds.

* * * * *